Jan. 10, 1939. W. E. GOBLE 2,143,192
DISK HARROW
Filed Jan. 7, 1938 2 Sheets-Sheet 2
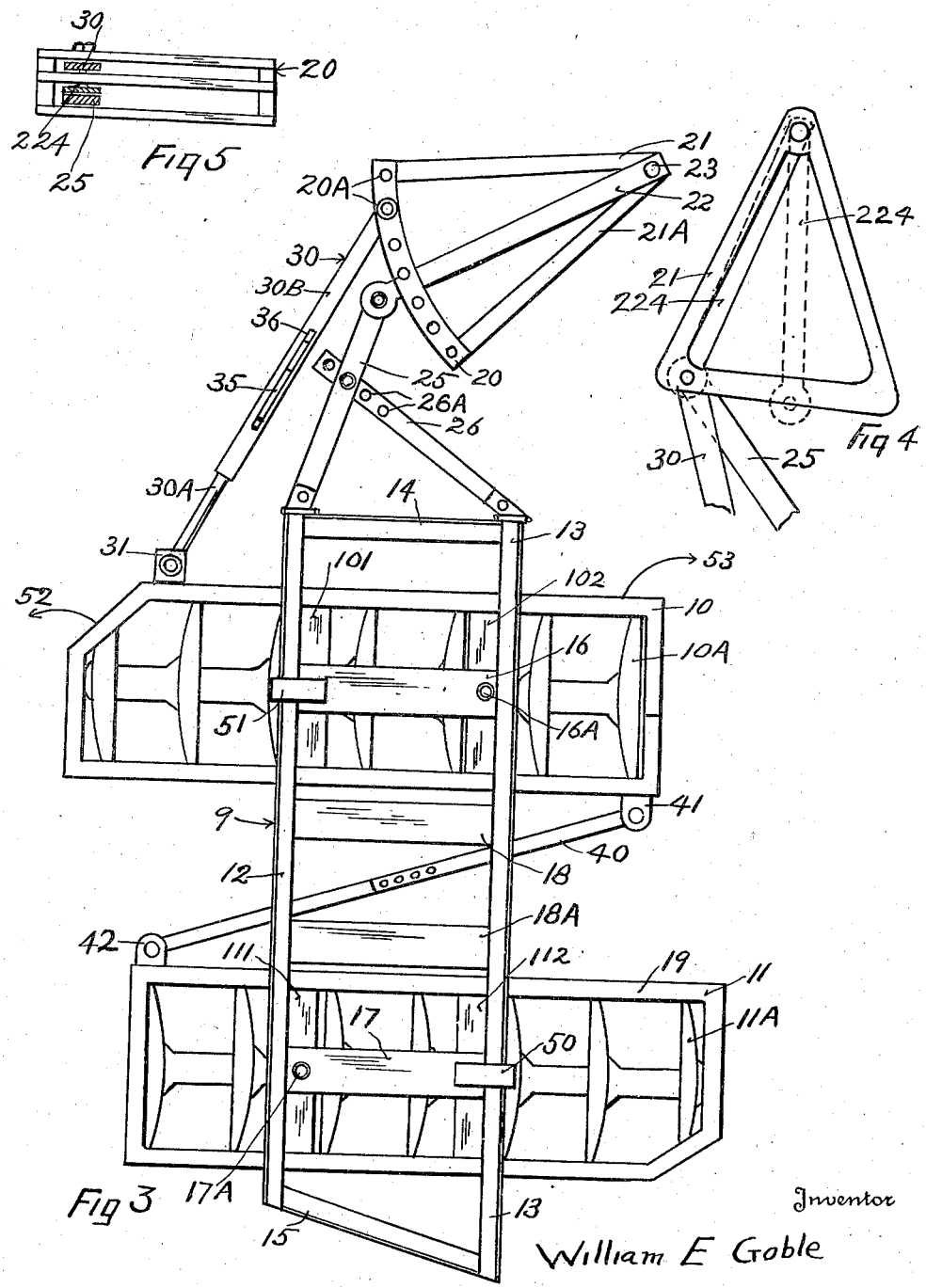
Inventor
William E Goble
By Francis C. Huebner
Attorney Patented Jan. 10, 1939

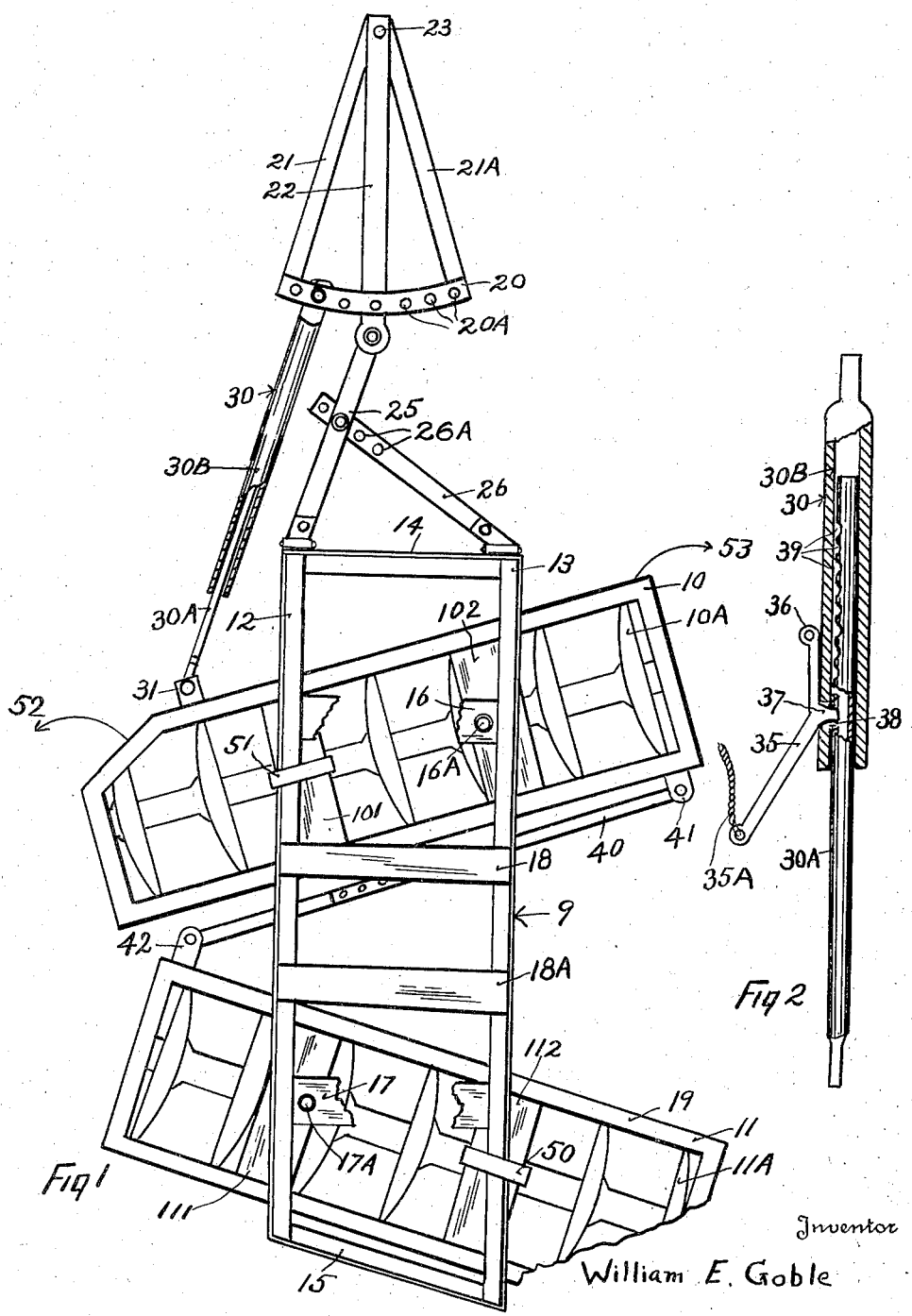

2,143,192

UNITED STATES PATENT OFFICE 2,143,192

DISK HARROW

William E. Goble, Fowler, Calif.

Application January 7, 1938, Serial No. 183,749

6 Claims. (Cl. 55—83)

My invention relates to a disk harrow, and more specifically to the offset type wherein two sections of disk blades are connected together and held at an angular relation with each other. The object I have attained is a new and novel device for holding together two sections of a disk harrow at selective angles with each other, said device permitting the harrow to automatically adjust itself so that it can be turned either to the right or to the left. Another object is to permit the two sections to automatically assume a parallel relation when turning toward the right, and to assume the selective angular relation with each other when pulling on an approximately straight line. Another object is a device which holds the two sections of the harrow on approximately the same horizontal plane. Another object is the simplicity of the device. Other objects will be hereinafter referred to.

These objects are accomplished by means of the device hereinafter described and illustrated on the accompanying drawings in which Fig. 1 is a top plan view of the device when assembled with a disk harrow and a tractor hitch, showing the two sections of the harrow in angular relation for working the soil.

Fig. 2 is an enlarged view of an adjustable arm for fixing the angle of assembled sections of disk blades.

Fig. 3 is a top plan view of the device when the sections are arranged parallel with each other in turning to the right.

Fig. 4 shows a modified form of hitch in which the locations of the pivotal connections of the draw bar and the auxiliary draw bar are on a vertical line.

Fig. 5 is an end view of the form of draw bar shown in Fig. 4.

Referring to the drawings, the front frame 10 of the disk harrow is adapted to carry the assembled front axle and disk blades attached thereto marked 10A. The rear frame 11 carries the assembled rear axle and disk blades, shown as 11A. It is noted that both the front and rear frames 10 and 11 are approximately rectangular with some of the corners rounded or cut off. On the top of frame 10 are platforms 101 and 102 which are spaced apart, and on the top of the rear frame 11 are platforms 111 and 112, also spaced apart. An auxiliary frame 9 is formed consisting of end pieces 14 and 15, and parallel side bars 12 and 13. Bars 12 and 13 should be spaced apart to correspond with the spaces between platforms 101 and 102, and 111 and 112. Cross members 18 and 18A connect bars 12 and 13 for the purpose of strengthening the auxiliary frame 9. Cross members 16 and 17 also incidentally assist in making the frame rigid, and are used as pivotal members as hereinafter set forth. Cross member 17 is pivotally connected with platform 111 adjacent to bar 12, and cross member 16 is pivotally connected with platform 102 adjacent to side bar 13. It is noted that by this means either the front or rear frames of the harrow are adapted to swing on a plane parallel with the plane of the auxiliary frame, and the frames can be swung so that the axles carried by the two frames are parallel with each other, or they can be positioned so that they are angular with each other.

The hitch shown in the drawings is approximately triangular in shape, but as shown in Figs. 1 and 3, the base 20 is shown as an arc, with the apex of the triangle as the approximate center of the arc. As shown in Figs. 1 and 3, arc 20 has a plurality of holes 20A therethrough, which can be used to connect an angling bar 30 at selective holes. Braces 21 and 21A form the sides of the triangle or hitch. This hitch can be attached to draft means not shown, by any well known manner.

An independent hitch bar 22 is pivotally connected near the apex of the triangle and is adapted to swing on said pivot. This hitch bar can be adapted to swing within the limits of the arc.

The disk harrow is connected with the hitch as follows: A draw bar 25 is pivotally attached at one end to the auxiliary frame, preferably to the front end of side bar 12, when the disk blades are arranged as shown and, pivotally attached at the other end to the swinging hitch bar 22. The connection of the draw bar 25 with the frame is preferably a universal hinge so the draw bar can be swung either vertically or horizontally. A brace 26 connects draw bar 25 at a point between the ends thereof to the front of the auxiliary frame, a spaced distance from the connection with the draw bar. This brace is preferably attached to the end of side bar 13. I have formed a plurality of holes 26A therein which are intended for adjustment of the angle of draw bar 25 with frame 9.

Angling bar 30 is also adapted as an auxiliary draw bar. Bar 30 is pivotally attached at one end to the arc member of the hitch, and at the other end with a universal pivotal connection to a lug 31 on the front bar of the front frame 10.

Angling bar 30 consists of a tube 30B, shown as pivotally attached to the hitch, or arc member of the hitch, and a rod or tube 30A which is adapted to telescope within tube 30B as shown in Fig. 2. Tube 30A is provided with a plurality of notches or holes 39, and tube 30B is provided with one hole 38 which is adapted to register with either of the holes 39. A lever 35 is pivotally attached to tube 30B, said lever having a projection 37 adapted to enter hole 38, and to interlock with either of the holes 39 which may be registered with hole 38. A rope 35A is used to manipulate the lever.

In Fig. 1 I have shown the position of the front and rear frames when angled for working the soil. It is noted that while the front and rear frames are angled as shown in Fig. 1, the disk can easily be turned toward the left, shown by the curved line 52, as the independent hitch bar 22 will automatically swing toward the pivot of the angling bar 30 and the hitch to which said angling bar 30 is attached. In turning toward the right, the direction shown by curved line 53, the blades would dig into the earth and make turning difficult, but in the use of my device as shown in Fig. 3, the angling bar 30 will pull the front and rear frames in parallel relation when turning toward the right, which makes turning toward the right comparatively easy.

In Fig. 4 I have shown a slightly modified form of hitch in which the adjustment holes may be eliminated, and the length of the hitch bar 224 is such that when it swings on its axis in turning toward the left, the pivotal point of hitch bar 224 with draft bar 25 can come directly under the pivotal point where auxiliary hitch 30 is connected to hitch 224. It is noted that the swing of draw bar 224 or 22 can be on a different plane than the pivoted connection of the auxiliary draft bar with the auxiliary hitch as illustrated in Fig. 5.

Having described my invention I claim as new and ask for Letters Patent:

1. An offset disk harrow having a front and rear frame, platforms on the top of each frame, said platforms being spaced apart, an auxiliary frame having side beams positioned approximately parallel with each other, and spaced apart the approximate distance the platforms are spaced apart on the frames, said auxiliary frame being positioned on the top of the platforms, and being pivotally attached to the front frame adjacent to one of said side bars and pivotally attached to the rear frame adjacent to the other of said side bars, guide means attached to the platforms not pivoted to the auxiliary frame, said guide means being adapted to hold the auxiliary frame adjacent to said platforms, a hitch consisting of a rigid frame in the approximate shape of a sector, a hitch bar pivotally attached to the hitch at the approximate center of the sector, said hitch bar being adapted to extend slightly beyond the curved member of the hitch, a draw bar pivoted at one end to the auxiliary frame and at the other end to the free end of the hitch bar, and an angling bar adjustable as to length pivotally attached at one end to the front frame, and at the other end to the curved member of the hitch.

2. An offset disk harow having a front frame and a rear frame, each of said frames being adapted to carry an axle having disk blades attached thereto, said axles being adapted to be rotated, each of said front and rear frames having platforms on the top thereof, the platforms on each of said frames being approximately uniformly spaced apart, an auxiliary frame having two beams arranged approximately parallel with each other, said beams being spaced apart the approximate distance the platforms on the frames are spaced apart, said auxiliary frame being pivotally attached to one of the platforms on the rear frame, adjacent to one side of the auxiliary frame, and to a platform on the front frame adjacent to the other side of said auxiliary frame, a hitch consisting of a rigid frame the approximate shape of a sector, a hitch bar pivotally attached to the hitch concentric with the sector, said hitch bar being adapted to extend slightly beyond the curved member of the hitch, a draw bar pivoted at one end to the auxiliary frame near a corner thereof, and at the other end to the free end of the hitch bar, an angling bar adjustable as to length pivotally attached at one end end to the front frame and at the other end to the curved member of the hitch, and a link connecting the frames on the adjacent sides near opposite ends thereof.

3. An offset disk harrow having a front frame and a rear frame, each of said frames being adapted to carry an axle having disk blades attached thereto, said disk blades being adapted to be rotated, each of said frames having platforms on the top thereof, the platforms on each frame being spaced approximately uniformly apart, an auxiliary frame having two side beams arranged approximately parallel with each other, and spaced apart the approximate distance the platforms are spaced apart on each of the frames, said auxiliary frame being pivotally attached adjacent to one side of the auxiliary frame to a platform on the front frame, and pivotally attached adjacent to the other side of the auxiliary frame to the rear frame, a hitch consisting of a rigid frame the approximate shape of a sector, a hitch bar pivotally attached to the hitch concentric with the sector, said hitch bar being adapted to swing, stops on the hitch to limit the distance of such swing, a draw bar pivoted at one end near a corner of the auxiliary frame and at the other end to the free end of the hitch bar, a brace extending from the draw bar to the auxiliary frame, and an angling bar pivotally attached to the front frame and to the curved member of the hitch.

4. An offset disk harrow having a front and rear frame, each of said frames being adapted to carry an axle having disk blades attached thereto, said disk blades being adapted to be rotated, the convex faces of the disks blades on the front frame being reversed from the direction of the convex faces of the disk blades on the rear frame, each of said frames having platforms on the top thereof, the platforms on each of said frames being spaced approximately uniformly apart, an auxiliary frame having two sides spaced apart approximately the same distance the platforms are spaced apart on the frames, cross members adapted to hold the frame rigid, the auxiliary frame being pivotally attached adjacent to one side of the auxiliary frame to a platform on the rear frame, and pivotally attached adjacent to the other side to a platform on the front frame, a hitch consisting of a rigid frame in the approximate form of a sector, a hitch bar pivotally attached to the hitch concentric with said sector, a draw bar pivoted at one end to the auxiliary frame near a corner thereof, and at the other end to the hitch bar, an angling bar adjustable as to length pivotally attached at one end to the front frame, and at the other end to the curved member of the hitch, and a link connecting adjacent sides of the front and rear frames near opposite ends of said frames.

5. In an offset disk harrow having a front frame and a rear frame adapted to carry disk blades, and having two platforms on the top of each frame, disposed on a common plane, the platforms on each frame being uniformly spaced apart, an auxiliary frame having two parallel beams spaced to adapt said auxiliary frame to rest on the four platforms, one of said beams being pivotally connected with a platform on the front frame and the other of said beams being pivotally connected to a platform on the rear frame, means for holding said auxiliary frame contiguous to said platforms, a hitch consisting of a frame in the approximate form of a sector, a hitch bar pivotally atached to the hitch approximately concentric with the sector, a draw bar pivoted to the auxiliary frame near one end of said frame, and to the hitch bar, and an angling bar pivotally attached near one end to the front frame and near the other end to the curved member of the hitch, the hitch bar being adapted to swing on a plane parallel with the plane of the hitch toward and from the connection of the angling bar with the hitch.

6. In a disk harrow having a front frame and a rear frame adapted to carry disk blades, an auxiliary frame having beams with approximately parallel sides, one of said beams being pivotally connected with the front frame and one with the back frame, a link connecting adjacent sides of the front and rear frames, and a hitch in the approximate shape of a sector, a hitch bar pivotally connected with the hitch concentric with the sector, a draft bar pivotally attached to and connecting the hitch bar and auxiliary frame, and an angling bar pivotally attached to and connecting the hitch and one of the frames on which the disk blades are mounted.

WILLIAM E. GOBLE.